(12) United States Patent
Holt

(10) Patent No.: US 8,218,720 B2
(45) Date of Patent: Jul. 10, 2012

(54) METHOD AND APPARATUS TO FACILITATE RECONSTRUCTING AN IMAGE USING FAN-BEAM DATA

(75) Inventor: Kevin Holt, Chicago, IL (US)

(73) Assignee: Varian Medical Systems, Inc., Palo Alto, CA (US)

( * ) Notice: Subject to any disclaimer, the term of this patent is extended or adjusted under 35 U.S.C. 154(b) by 258 days.

(21) Appl. No.: 12/046,347

(22) Filed: Mar. 11, 2008

(65) Prior Publication Data

US 2008/0226021 A1 Sep. 18, 2008

Related U.S. Application Data

(60) Provisional application No. 60/894,313, filed on Mar. 12, 2007.

(51) Int. Cl.
*A61B 6/00* (2006.01)

(52) U.S. Cl. ............................ 378/14; 378/4; 382/131

(58) Field of Classification Search ................ 378/4, 14
See application file for complete search history.

(56) References Cited

U.S. PATENT DOCUMENTS

| | | | | |
|---|---|---|---|---|
| 4,136,388 A * | 1/1979 | Lindquist | | 378/4 |
| 4,191,892 A * | 3/1980 | Huang et al. | | 378/14 |
| 4,313,163 A * | 1/1982 | Mizutani | | 378/14 |
| 4,578,753 A * | 3/1986 | Crawford et al. | | 378/11 |
| 4,580,219 A * | 4/1986 | Pelc et al. | | 382/131 |
| 4,894,775 A * | 1/1990 | Kritchman et al. | | 378/4 |
| 4,989,225 A * | 1/1991 | Gupta et al. | | 378/10 |
| 5,032,990 A * | 7/1991 | Eberhard et al. | | 378/4 |
| 5,216,601 A * | 6/1993 | Crawford et al. | | 378/14 |
| 5,991,356 A * | 11/1999 | Horiuchi et al. | | 378/8 |
| 6,118,841 A * | 9/2000 | Lai | | 378/19 |
| 6,169,779 B1 * | 1/2001 | Lai | | 378/19 |
| 6,744,844 B2 * | 6/2004 | Horiuchi | | 378/15 |
| 7,286,630 B2 * | 10/2007 | Holt | | 378/8 |
| 2001/0038678 A1 * | 11/2001 | Grass et al. | | 378/4 |
| 2003/0133533 A1 * | 7/2003 | Bruder et al. | | 378/4 |
| 2003/0185337 A1 * | 10/2003 | Hsieh | | 378/4 |
| 2003/0194048 A1 * | 10/2003 | De Man et al. | | 378/4 |
| 2004/0028173 A1 * | 2/2004 | van de Haar | | 378/4 |
| 2004/0114707 A1 * | 6/2004 | Bruder et al. | | 378/4 |
| 2005/0100124 A1 * | 5/2005 | Hsieh et al. | | 378/4 |
| 2007/0140412 A1 * | 6/2007 | Holt | | 378/8 |
| 2007/0274456 A1 | 11/2007 | Holt | | |

FOREIGN PATENT DOCUMENTS

WO 2007050083 A1 5/2007

OTHER PUBLICATIONS

Hsieh, Computed Tomography: Principles, Design, Artifacts, and Recent Advance; pp. 12-13; SPIE Press; 2003.

(Continued)

*Primary Examiner* — Alexander H Taningco
(74) *Attorney, Agent, or Firm* — Fitch, Even, Tabin & Flanner, LLP

(57) ABSTRACT

One provides (101) fan-beam data via a translate-rotate computed tomography acquisition process and then reconstructs (102) an image from this data without resampling any pixel positions other than to optionally resample pixel positions to compensate for non-uniform translation intervals. These embodiments also provide for reconstructing this image from this data without interpolating any pixel positions other than to optionally interpolate pixel positions as again may be useful to compensate for non-uniform translation intervals.

29 Claims, 5 Drawing Sheets

OTHER PUBLICATIONS

Noo et al., "Analytic Method Based on Identification of Ellipse Parameters for Scanner Calibration in Cone-Beam Tomography," Physics in Medicine and Biology, vol. 45, 2000, pp. 3489-3500.

Bingham et al., "Calibration and Performance Testing for Reconfigurable Computed Tomography Systems," Materials Evaluation, Nov. 2007, 6 pages.

* cited by examiner

METHOD AND APPARATUS TO FACILITATE RECONSTRUCTING AN IMAGE USING FAN-BEAM DATA

RELATED APPLICATION(S)

This application claims the benefit of U.S. Provisional application No. 60/894,313, filed Mar. 12, 2007, which is incorporated by reference in its entirety herein.

This application is related to co-owned U.S. patent application Ser. No. 12/046,337, entitled METHOD AND APPARATUS TO FACILITATE FORMING DETECTOR-LEVEL CALIBRATION INFORMATION FOR A HIGH ENERGY-BASED SCANNER and filed on even date herewith (Mar. 11, 2008), which is incorporated by reference in its entirety herein.

TECHNICAL FIELD

This invention relates generally to the reconstruction of images using fan-beam data as has been provided via a translate-rotate computed tomography acquisition process.

BACKGROUND

The acquisition of fan-beam data using translate-rotate (TR) computed tomography (CT) (also often referred to as second generation) comprises a known area of endeavor. Using the resultant fan-beam data to form a corresponding image often involves the use of so-called sort-to-parallel algorithms. Though useful for at least some application settings, these sort-to-parallel algorithms do not meet the all requirements in all settings.

For example, many prior sorting algorithms typically require a resampling step in the channel and view directions and also typically require a resampling step in the view direction. These resampling steps are often done using interpolation (though, to be clear, resampling will be understood to refer to changing the set of locations where samples are effectively located and interpolation will be understood to refer to looking up (or synthesizing) the value of a datum at a location that does not exist). This in turn, can lead to loss of image quality due to the interpolations.

As another example, prior sorting algorithms typically require the rotation increment to either be equal to the fan angle or to match the known angular spacing between two arbitrary channels. This, in turn, imposes requirements upon rotation positions (for example, to avoid arbitrary fan overlap circumstances as may otherwise occur between successive translations). Such requirements can potentially impact image quality.

With at least some prior approaches the rotation increment must exactly match the fan angle (or an integer multiple of channel pitch or the like) if the geometry is accurately known ahead of time. As a result, if one guesses wrong when collecting the data and only later understands the geometry in better terms later, it will nevertheless be too late to use that information. Similarly, one cannot modify any determined geometry values that affect fan angle (source-to-detector distance or fan-angle itself being the prime candidates) after the fact to try and make the images better.

BRIEF DESCRIPTION OF THE DRAWINGS

The above needs are at least partially met through provision of the method and apparatus to facilitate reconstructing an image using fan-beam data described in the following detailed description, particularly when studied in conjunction with the drawings, wherein.

Figure 2:
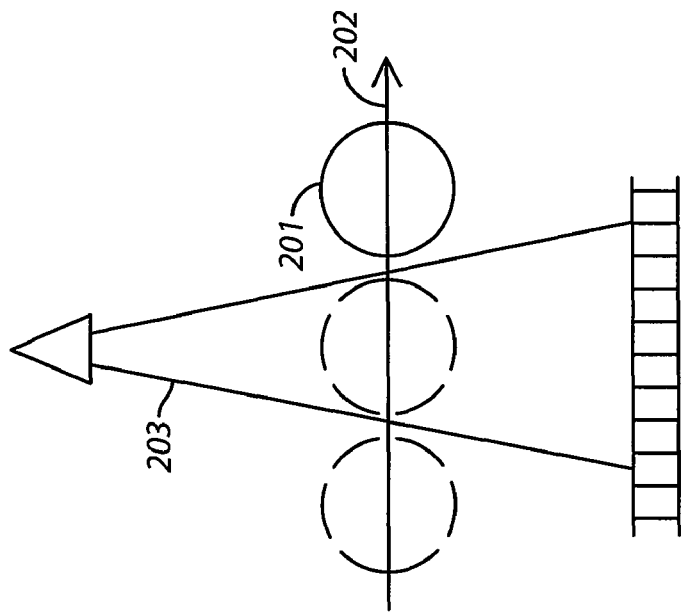
FIG. 2 comprises a schematic view as configured in accordance with the prior art.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, one provides fan-beam data via a translate-rotate computed tomography acquisition process and then reconstructs an image from this data without resampling any pixel positions other than to optionally resample pixel positions to compensate for non-uniform translation intervals.

By one approach, this reconstruction can comprise grouping together pixels as correspond to fan-beam rays that share a same angle notwithstanding translational differences between the fan-beam rays to provide resultant pixel groups. This pixel group information can comprise, at least in part, ray-spacing information and/or ray angle information (where ray angle information will be understood to comprise, for example, a rotation angle as corresponds to the pixels comprising a given pixel group and/or a fan-beam-referenced angle).

By one approach, this reconstruction can comprise sorting the fan-beam data into parallel-beam data and then performing parallel-beam reconstruction. This might comprise, for example, performing filtered-backprojection (while taking into account, for example, a different central-ray value and a different ray-spacing for each ray group).

So configured, these teachings provide for reconstructing an image in a manner that avoids resampling altogether (with the possible and optional exception of resampling pixel positions for the purpose of compensating for non-uniform translation intervals). In particular, these teachings avoid the use of resampling channels, resampling rotation positions, and/or resampling translation positions. Those skilled in the art will also appreciate that these teachings will readily accommodate arbitrary and/or irregularly spaced rotation positions (at least so long as the rotation increments do not significantly exceed the fan angle). It will also be appreciated that these teachings tend to yield resultant reconstructed images having improved quality as compared to typical prior art results.

Figure 1:
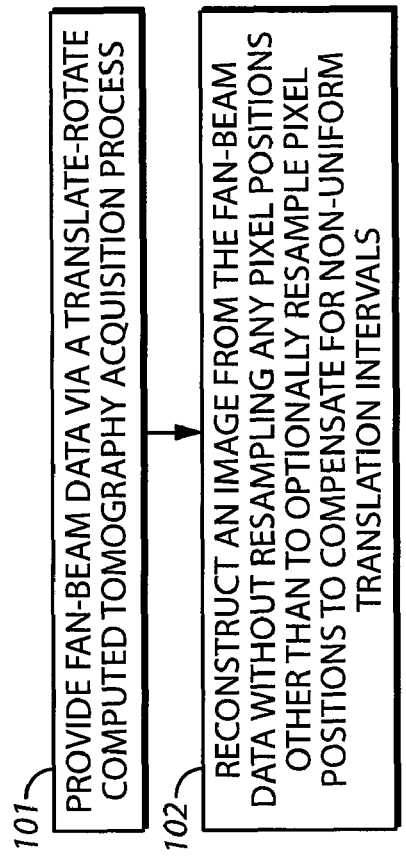
FIG. 1 comprises a flow diagram as configured in accordance with various embodiments of the invention.

These and other benefits may become clearer upon making a thorough review and study of the following detailed description. Referring now to the drawings, and in particular to FIG. 1, an illustrative process that is compatible with many of these teachings will now be presented.

At the outset, it will be noted that all angles referred to in this description are expressed in radians unless otherwise noted. It will also be noted that the description makes use of specific notation by which certain elements, concepts, or actions are represented. For the convenience of the reader, such notation shall be understood as follows:

equi-angular detector channels are spaced at equal angles (a curved detector)
equi-spatial detector channels are spaced at equal distances (a flat detector)

Input Data:
P(channel,pidx,traverse) fan-beam projection data
$N_{channels}$ number of channels in the detector
$N_{tranpos}$(traverse) number of translational positions in each traverse
$N_{traverses}$ number of traverses in one full scan
$X_D$[channel] 1D distortion table
β(traverse) table rotation position angle
detPitch detector pitch at the detector (mm)
SOD distance from the x-ray source to the rotation-axis (mm)
SID distance from the x-ray source to the detector (mm)
TranDir(traverse) table translation direction
Δptable translation increment (mm)
Differential differential between forward and reverse position readings (mm)
$N_{rays}$ number of rays to put in the output sinogram
TrimChannels edge channels to discard
$P_{ray}^{in}$ perpendicular-ray for the input data
γ[channel] angle of a source ray relative to input perpendicular ray
pos(pidx,traverse) table translational position (mm)
$pos_{cent}$ center position for translational motion (mm)

Internal Variables:
channel channel number
pidx translational position index
traverse traverse number (same as rotational position index)
p table translation position (mm)
FA full fan-angle (radians)
Δβ table rotation increment (radians)
Oversample oversampling ratio
ray ray number, the column index of output projection data
view view number, the row index of output projection data
t orthogonal displacement of a ray from the table center (mm)

Output Data:
$P_{par}$(ray,view) output parallel projection data
$N_{views}$ number of views in the output sinogram
$c_{ray}^{out}$(view) central ray for output sinogram (view-dependent)
θ(view) view angle for output sinogram (view-dependent)
Δt(view) ray pitch (spacing) for output sinogram (view-dependent)

This process 100 provides for providing 101 fan-beam data via a translate-rotate computed tomography acquisition process. Various ways of effecting such a process are known in the art. Generally speaking, and referring momentarily to FIG. 2, a table 201 which supports an object (not shown) to be imaged, is moved along a translation axis 202 to thereby move the table 201 through a fan-beam 203. Once the table 201 has moved completely outside the fan-beam 203, the table 201 is rotated a bit and the process repeated until the table 201 has been rotated through at least (or not significantly less than) 180 degrees minus the fan angle (with fan angle being defined as the angle between the first and last detector channel, as seen from the source). By one approach the table 201 begins at the same starting point, or at least the same side of the fan-beam, for each pass. By another approach, the process accommodates bidirectional movement of the table 201 and hence an imaging pass can begin on either side of the fan-beam 203.

Those skilled in the art will recognize and appreciate that while in the illustrative example provided the object passes completely through the full X-ray fan beam, this is not a necessary requirement. Instead, if desired, the object's movement may be limited to effect exposure to only some subset or sub-region of the detector. One could then discard the data outside this sub-region. Those skilled in the art will also recognize and appreciate that with the right weighting (which might need to be pixel-dependent and not just ray-group dependent), one could make the same translations as in the above example, but instead of discarding data, use most (or even all) of the data from a given selection of channels that might otherwise be discarded.

Figure 3:
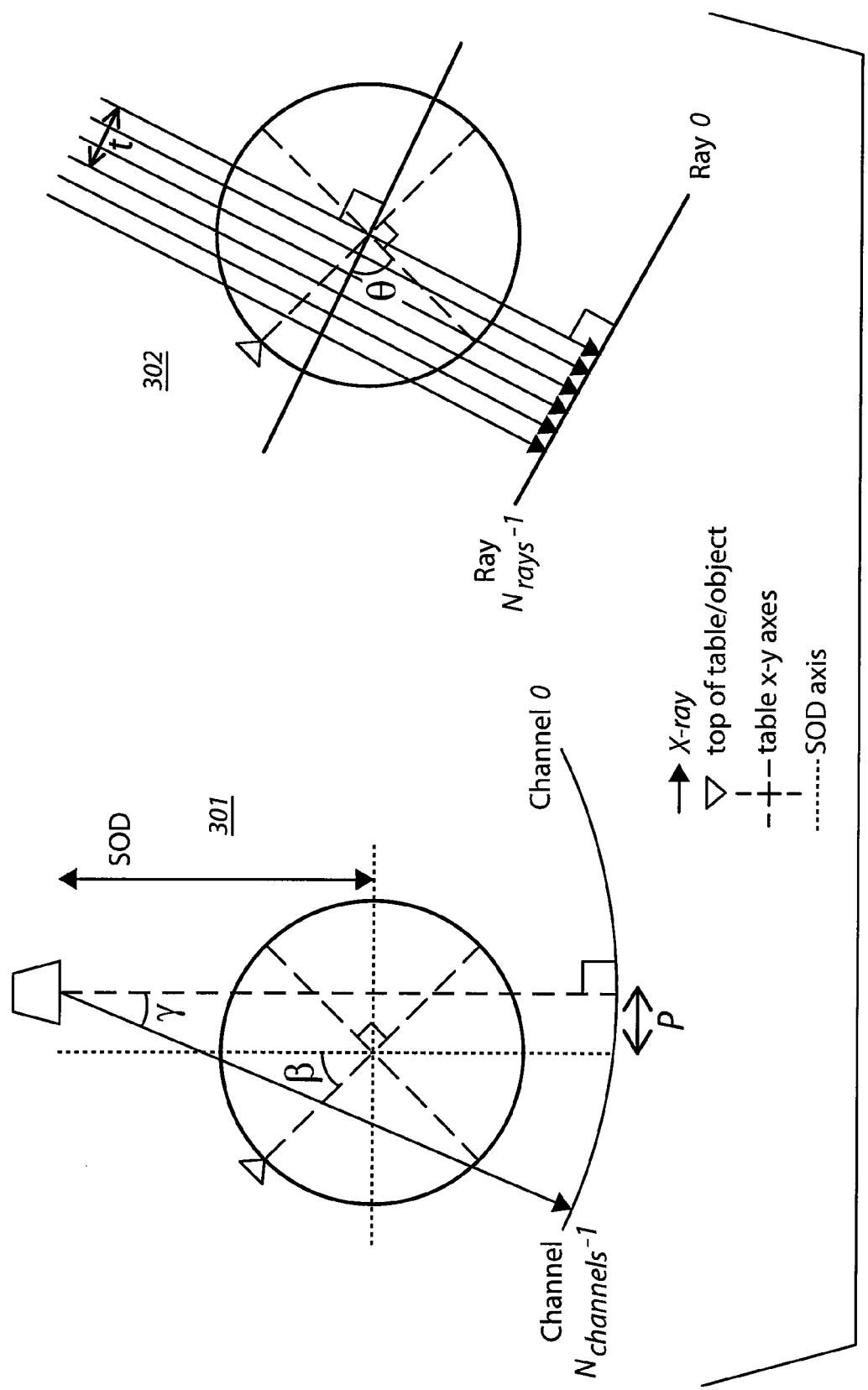
FIG. 3 comprises schematic views as configured in accordance with various embodiments of the invention.

Referring now to FIG. 3, the physical geometry as corresponds to an equi-spatial detector and an equi-angular detector can be seen as generally denoted by reference numeral 301. FIG. 3 also presents a depiction 302 as corresponds to the virtual parallel geometry to which these teachings will sort. The correspondence between the physical and virtual geometries is through the following geometric relations:

$$\theta = \beta - \gamma \quad (1)$$

$$t = SOD \times \sin\gamma - p \times \cos\gamma \quad (2)$$

These teachings make use of values that can be derived by mapping (γ, p, β) values to the equivalent (θ,t) values.

Returning again to FIG. 1, this process 100 then provides for reconstructing 102 an image from the fan-beam data without resampling any pixel positions other than to optionally resample pixel positions to compensate for non-uniform translation intervals should such be the case. Generally speaking, for most application settings it will be desired to ensure that translation intervals are constant to thereby avoid such interpolations or resampling. In some cases, minor fluctuations in translation interval may be tolerated and ignored. Nevertheless, when translation intervals are significantly non-uniform, these teachings will accommodate reconstructing an image from the resultant fan-beam data using resampling and/or interpolation.

By one approach, this step of reconstructing 102 an image can comprise grouping together pixels as correspond to fan-beam rays that share a same angle notwithstanding translational differences between the fan-beam rays to thereby provide resultant pixel groups. If desired, this grouping step can itself comprise not using pixels from at least some fan-beam rays that do not usefully contribute to a reconstructed image. By this approach, fan-beam data representing rays that never intersect the field of view, for example, can be discarded fairly early to thereby ease archival requirements, bandwidth requirements, and computational requirements. In some cases, suitably discardable data can comprise upwards of 30% of the fan-beam data and hence these savings can be considerable.

By one approach, this grouping step can itself comprise storing pixel group dependent information as corresponds to the resultant pixel groups. The particular nature of this information can vary with respect to the needs and/or opportunities as tend to characterize a given application setting. By one approach, this pixel group dependent information can comprise, at least in part, ray-spacing information (where ray-spacing will be understood to refer to the spacing between rays when considered as part of a parallel sinogram as will be appreciated by those skilled in the art).

By another approach, alone or in combination with the foregoing, this pixel group dependent information can comprise, at least in part, ray angle information. Examples in this regard include, but are not limited to, using one or more of a rotation angle as corresponds to the pixels that comprise a given pixel group, a fan-beam-referenced angle (such as an angle that is measured from a central ray as corresponds to the fan-beam), and the like. As one particular non-limiting illustrative example in this regard, the ray angle information can comprise a sum of the rotation angle and the fan-beam-referenced angle. (As used herein, this reference to a "sum" will be understood to refer a summing of two or more values where the sign for one or more of the values can be negative or positive and hence a given sum can potentially represent a difference between two values).

By one approach, the aforementioned step 102 of reconstructing an image can comprise sorting the fan-beam data into parallel-beam data and then performing parallel-beam reconstruction. This parallel-beam reconstruction can comprise, for example, the use of filtered backprojection as is known in the art. Those skilled in the art will recognize that other actions and processes may be utilized as well, including but not limited to normalizations, corrections, filtering, and so forth.

Performing parallel-beam reconstruction can further comprise, if desired, taking into account a different central-ray value and a different ray-spacing for each ray group. Such an approach can permit the avoidance of intra-ray-group resampling (and/or corresponding interpolations) so long as the translation increments remains essentially constant.

By one approach, each such ray group can be weighted according to a local density as corresponds to ray group view angles. To illustrate by way of an non-limiting example, for ray groups where the rotation angle summed with the fan-beam-referenced angle is locally spaced by, say, two degrees between ray groups, such rays can be accorded twice as much weight as ray groups that are locally spaced by one degree between ray groups.

By one approach, each such ray group can be further grouped into translation groups, with each ray group then being weighted according to translation group overlap. To again illustrate by way of a non-limiting example, consider a scenario where the fan-beam occupies thirty degrees but rotation is only twenty-five degrees. For a first rotation, the ray angles (that is, the sum of rotation-angle with fan-beam-reference-angle) will range from zero to thirty degrees. For the second rotation, the ray angles will range from twenty-five degrees to fifty-five degrees, for the third rotation the range will be from fifty degrees to eighty degrees, and so forth. In such a case, the rays from thirty degrees to fifty degrees would be given full weight (which will be valued here as a weight of "one"). Accordingly, for the first translation, rays at twenty-five degrees from the first translation would have a full weight accorded to them. This weighting for the first translation group, however, will steadily decrease with the ray-angle and conclude with the ray-group at thirty degrees where the weighting would be zero. Conversely, for the second translation, the ray-group at thirty degrees would have full weight with the ray-group at twenty-five degrees having zero weight, thereby smoothly transitioning between the two. By one approach, the weighting functions can always sum to a value of one. By another approach, the weighting functions can be always either zero or one, and ray-groups with a value of zero can be discarded early on.

Those skilled in the art will note and appreciate that the rotation increment need not be constant for such teachings to apply in an effective manner. The rotation increment could be, for example, 25.0 degrees for the first translation, 24.7 degrees for the second translation, 18.0 degrees for the third translation, and so forth. This ability to well accommodate arbitrary (or at least changing) and non-uniform rotation increments can serve as an important feature in many application settings (and reduce hardware requirements/costs for the motion system).

It will be appreciated that these teachings can be employed, for example, to accommodate the provision of fan-beam data via a translate-rotate computed tomography acquisition process and to also accommodate the provision of information regarding corresponding fan-beam-referenced channel angles by then providing for the reconstruction of an image from the fan-beam data as a function, at least in part, of rotate-positions and the fan-beam-referenced channel angles. Such an approach can again provide for weighting each ray group according to a local density as corresponds to ray group view angles and where the ray groups are further grouped into translation groups (where each ray group is weighted according to translation group overlap).

For the sake of example and more detailed instantiation that accords with teachings will now be provided. Those skilled in the art will appreciate and recognize that the presentation of such details is intended to serve only as an illustrative example and is not intended to serve as an exhaustive or otherwise limiting example in this regard.

It may be helpful to first briefly recall certain aspects of the rotational movement that characterizes the translate-rotate computed tomography acquisition process. For purposes of this discussion, rotational positions are indexed by traverse. At index traverse, the table is at rotational position $\beta(\text{traverse})$. Usually, these will be equally spaced:

$$\beta(\text{traverse}) = \text{traverse} \times \Delta\beta \times \text{RotDir} + \beta_o \qquad (3)$$

but this is not a requirement. For purposes of this example it will be presume that $\beta$ is a value that must be either monotonically increasing or decreasing with traverse. If increasing, RotDir=1. If decreasing, RotDir=−1.

To get good image quality, though, one should use rotation increments no more than one channel pitch beyond the fan angle, with the total scan covering at least 180°. That is, the rotation positions should, at least approximately, satisfy $$|\beta(\text{rotid}x+1) - \beta(\text{rotid}x)| \leq FA + \Delta\gamma \qquad (4)$$

and $$|\beta(N_{rotpos}-1) - \beta(0) + FA + \Delta\gamma \geq \pi \qquad (5)$$

where FA is the full fan angle and $\Delta\gamma$ is the angular pitch of one channel.

As noted earlier, in such a data acquisition process the translational motion can be characterized as either being unidirectional or as bidirectional. To accommodate a variety of cases, the following description employs the following general definition:

Let $TranDir$(traverse) = $\begin{cases} 1, & p \text{ increases with time during the traverse} \\ -1, & p \text{ decreases with time during the traverse} \end{cases}$ Accordingly, scanning will normally be one of the following:

Unidirectional scan (positive translation)$TranDir$(traverse) =
$$1 \text{ for all traverse}$$
Unidirectional scan (negative translation)$TranDir$(traverse) =
$$-1 \text{ for all traverse}$$
Bidirectional scan (initially positive) $TranDir$(traverse) =
$$\begin{cases} 1, & \text{for traverse even} \\ -1, & \text{for traverse odd} \end{cases}$$
Bidirectional scan (initially negative) $TranDir$(traverse) =
$$\begin{cases} -1, & \text{for traverse even} \\ 1, & \text{for traverse odd} \end{cases}$$

By one approach the corresponding processing can rely on a translation-increment parameter, $\Delta p$, specified in mm. In many application settings, however, it may be more convenient for the end user to specify an oversampling ratio rather than the translation increment. To use Oversample as an input, the pitch could be calculated as:

$$\Delta p = \frac{SOD}{SID} \times \frac{detPitch}{Oversample} \qquad (6)$$

Figure 4:
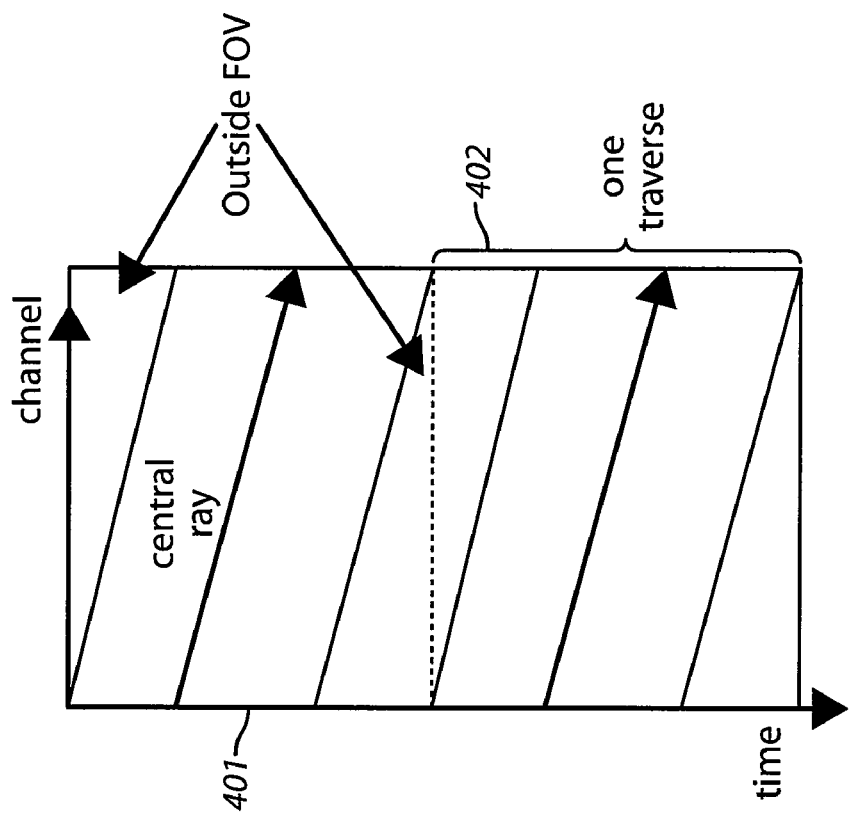
FIG. 4 comprises a schematic view as configured in accordance with various embodiments of the invention.

Referring now to FIG. 4, input acquisition is illustrated for a unidirectional scan 400 (the central-ray slopes will alternate for a bidirectional scan). For the sake of simplicity only two traversals 401 and 402 are shown in this example.

Figure 5:
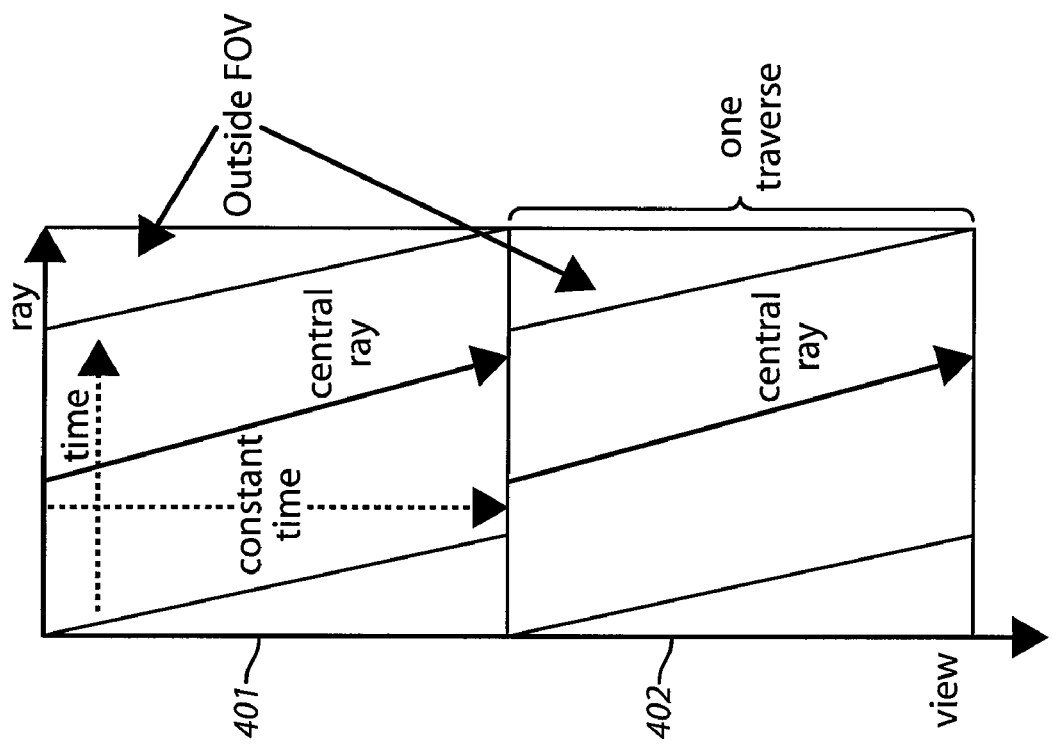
FIG. 5 comprises a schematic view as configured in accordance with various embodiments of the invention.

There are several potential approaches to converting this unidirectional scan to a parallel geometry. A first approach (represented in FIG. 5) is to just transpose each traverse 401 and 402. Note that this transpose may either be performed explicitly, by rearranging data in memory to effect the transpose, or implicitly, where the data remains organized as in 400 in memory and the indexing operation in the reconstruction algorithm is adjusted to pull data from these transposed positions. As a second approach (represented in FIG. 6), each traverse is transposed and each row is shifted horizontally (thereby effectively joining the central ray 601) so that a central pin would appear exactly vertical. As a third approach (represented in FIG. 7), each traversal 401 and 402 is instead shifted horizontally by integer amounts so that the pin appears to be almost vertical.

The first and third approaches just set forth have an advantage in that these approaches avoid any resamplings. This, in turn, results in a fast algorithm with optimal reconstruction image quality. The second and third approaches present an advantage in that empty data (that is, the data denoted as being outside of the field of view (FOV)) can be trimmed away (the trimmed region can be a substantial portion of the data) and also in that the sinogram follows the typical convention that a vertical line in the sinogram corresponds to a constant distance from the rotation axis and thus can easier provide information (such as diagnostic information) to a human observer accustomed to examining sinograms organized with such conventions.

Taking these things into account, the third method may be a preferred approach for many application settings and will be the approach that is presumed to be used in this description. One possible disadvantage of this third approach (shared with the first approach) is that this approach has a row-dependent output central ray. This can prompt some care in reconstruction and can also affect sinogram readability as the output central ray value will have small row-to-row fluctuations (up to, for example, ±0.5 pixels peak-to-peak). Properly handled, however, these fluctuations (as well as the larger fluctuations seen in the first approach) should not adversely affect reconstruction.

Figure 8:
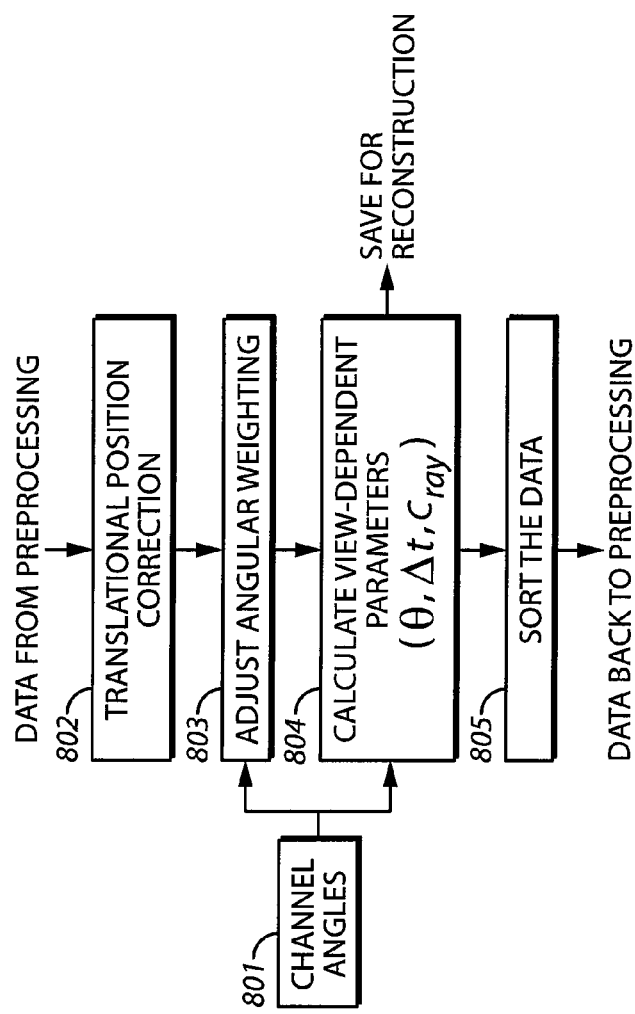
FIG. 8 comprises a flow diagram as configured in accordance with various embodiments of the invention.

A sort-to-parallel can be applied during preprocessing. FIG. 8 presents one approach 800 to effecting such a sort. In this illustrative example the steps of this approach 800 are designed so that each traverse could be fully processed before beginning a next traverse. Similarly, one could begin processing one traverse at the same time that one begins collecting the next traverse, doing both steps concurrently. This can aid with avoiding temporal lag during processing and reconstruction.

This approach 800 makes use of a list 801 of, for each channel, the angle of the channel relative to the input perpendicular ray. Those skilled in the art will recognize that this list 801 of channel angles may be calculated from the corresponding system geometry and/or can be measured through calibration. These angles are dependent on the location of the source and detector but not the table (thus these angles do not change from traverse to traverse, or likely even scan to scan).

These angles may optionally be calibrated through a so-called find geometry procedure as is disclosed in the aforementioned METHOD AND APPARATUS TO FACILITATE FORMING DETECTOR-LEVEL CALIBRATION INFORMATION FOR A HIGH ENERGY-BASED SCANNER. In this case, the list 801 of angles could be supplied to this approach 800 through the input $\gamma$[channel]. It may be desirable to allow for a slight shift of overall detector position, or similarly, for the perpendicular ray to have changed slightly since the angles were calibrated. Thus the calibrated angles $\gamma_{calib}$[channel] could be measured with respect to some arbitrary channel or location, then the angles used in this algorithm are $$\gamma[\text{channel}] = \gamma_{calib}[\text{channel}] - \gamma_{calib}[P_{ray}]$$

where generally the perpendicular ray, $P_{ray}$, will not be an integer, so $\gamma_{calib}$ will be interpolated to find the value of $\gamma_{calib}[P_{ray}]$.

As noted above, if these angles are not measured directly, the channel angles may instead be calculated from the basic geometry. The angles depend on:
  the array type (flat, curved, polygon, etc)
  the distortion-correction table, $X_D[\ldots]$, if applicable
  the perpendicular ray.
Distortion (such as from an image intensifier or optical taper) may be handled either by:
  applying distortion correction prior to effecting this approach 800; or
  accounting for the distortion during the steps that comprise the approach 800.

The latter option avoids interpolation and provides higher output image quality. This approach, however, may be best suited for 1D distortion (such as for an optical taper or a detector with inter-module gaps) and may be less useful for 2D distortion that warps across segments (such as image-intensifier distortion). Accordingly, for 2D distortion, distortion correction is perhaps better applied prior to effecting the steps of this approach 800. Note that the distortion table may often be measured from a find geometry procedure that may be capable of producing both channel angles and distortion tables (the find geometry procedure may even calculate the channel angles first then derive the distortion tables from them). In such a case, it is often preferable (and presumably more accurate) to use the channel angles directly produced by the find geometry procedure, rather than to let it calculate the distortion table, then invert the distortion table and derive the channel angles from that. Nevertheless, the steps for treating a distortion table are included in the possibilities for calculating channel angles described below.

If the detector has no distortion (or distortion is negligible and is to be ignored), or if distortion correction is applied prior to implementing this approach 800, a null distortion table can be imagined:

$$X_D^{inv}[\text{channel}] = \text{channel} \tag{7}$$

Otherwise, the distortion table must be inverted before it can be used. To invert the table, step through all $0 \leq i < N_{channels}$ and calculate:

$$X_D^{inv}[n] = i + \frac{n - X[i]}{X_D[i+1] - X_D[i]} \tag{8}$$

for any and all n such that $$X_D[i] \leq n < X_D[i+1] \tag{9}$$

Note that the above represents linear interpolation. Other interpolation methods or kernels can of course be used instead.

For boundary conditions, one may replicate the nearest edge value. When accounting for distortion in this way, it can be useful to specify the rotation increment to be a little smaller than the fan angle so that edge channels will be thrown away in the Adjust Angular Overlap step 803.

The theoretical channel angles (in radians) can be calculated by the following equations:

For a flat array:

$$\gamma[\text{channel}] = \arctan\left(\frac{detPitch \times (X_D^{inv}[\text{channel}] - P_{ray}^{in})}{SID}\right) \tag{10}$$

For an ideal curved array:

$$\gamma[\text{channel}] = \frac{detPitch \times (X_D^{inv}[\text{channel}] - P_{ray}^{in})}{SID} \tag{11}$$

For other detector types, such as a polygonal approximation to a curved array, one can make similar analytic calculations of channel angle (though it is probably best just to calibrate such arrays using a find geometry procedure).

This approach 800 takes the preprocessed data and optionally provides for translational position correction 802. This can comprise the translation-axis analogue of channel resampling or rotational position correction as sometimes occurs during the preprocessing stage.

The algorithm for this approach 800 relies on the translational positions being equally spaced (or very nearly so). Those skilled in the art will note, however, that only the spacing has an impact in this regard; this approach 800 will readily accommodate, for example, when different traverses start at different positions.

When the detector is triggered by translation position, this requirement is usually already satisfied. When the detector is time-triggered, however, resampling the data to equal translation increment can be appropriate (depending on the stability of the time pulses and of the velocity in the physical motion system). A useful resampling algorithm for use in such a case will now be described. Often, translate-rotate scanning will be performed with a very fine translation increment, in which case the interpolation losses incurred in resampling translation positions may be minimal. For coarser translation increments, the interpolation losses may be more severe. It will be appreciated, then, that as resampling introduces interpolation losses, and consumes processing resources, this resampling step should only be applied for irregular data and it should be skipped for uniform data.

Inputs:
$P_{in}$(channel, pidx, traverse) Preprocessed projection data
$pos_{in}$(pidx,traverse) Acquired translational positions (mm)
$N_{tranpos}^{in}$(traverse) Number of acquired positions in each traverse
TranPosMin,TranPosMax Range of positions to resample to (mm)
$\Delta p$ Desired translational spacing (mm)
TranDir(traverse) Direction of translation during each traverse Outputs:
$P_{corr}$(channel, pidx, traverse) Projection data with equal translational spacing
$pos_{corr}$(pidx,traverse) Output translational positions (mm), equally spaced
$N_{tranpos}^{out}$ Number of output translational positions per traverse The number of output positions is the same for all traverses and is calculated as:

$$N_{tranpos}^{out} = 1 + \text{floor}\left(\frac{TranPosMax - TranPosMin}{\Delta p}\right) \tag{12}$$

where TranPosMin and TranPosMax can be the conservative nominal range of intended position values (i.e. a conservative estimate of the minimum and maximum translation positions), or they can be derived retrospectively from the measured positions. In the latter case, TranPosMax can be calculated by finding the maximum value of pos for each traverse and taking the minimum of all such maxima, and TranPosMin can be calculated by finding the minimum value of pos for each traverse and taking the maximum of all such minima. The output positions will be resampled to:

$$pos_{corr}(pidx', \text{traverse}) = \tag{13}$$

$$\begin{cases} TranPosMin + \Delta p \times pidx', & \text{if } TranDir(\text{traverse}) = 1 \\ TranPosMax - \Delta p \times pidx', & \text{if } TranDir(\text{traverse}) = -1 \end{cases}$$

for $0 \leq pidx' < N_{transpos}^{out}$

The resampling equations are as follows (for simplicity and the sake of clarity the traverse index has been omitted)

$$P_{corr}(channel, pidx') = \qquad (14)$$
$$f \times [P_{in}(channel, pidx) - P_{in}(channel, pidx - 1)] +$$
$$P_{in}(channel, pidx - 1)$$

where $$pos_{in}(pidx - 1) < pos_{corr}(pidx') \leq pos_{in}(pidx) \qquad (15)$$
for $TranDir = 1$ $$pos_{in}(pidx - 1) > pos_{corr}(pidx') \geq pos_{in}(pidx) \qquad (16)$$
for $TranDir = -1$
and $$f = \frac{pos_{corr}(pidx') - pos_{in}(pidx - 1)}{pos_{in}(pidx) - pos_{in}(pidx - 1)} \qquad (17)$$

Note that (14)-(17) comprise linear interpolation. Other interpolation methods or kernels can of course be used. For boundary conditions, the sample can be replicated at the nearest translation-position (though a proper selection for TranPosMin and TranPosMax can eliminate the need for boundary checking).

Note that each traverse may have a different number of translation positions. This may be useful, especially for the time-triggered case, in that the system can keep collecting views until the object has fully left the fan beam, and make use of however many translation positions are actually collected without committing to an exact prescribed number of views.

When position correction is enabled, all the processing steps set forth below apply to the corrected data and positions. For the sake of simplicity and clarity, then, the corr subscript will now be dispensed with.

By one approach, one can then measure the angular overlap and calculate the corresponding weights for each ray group.

Figure 9:
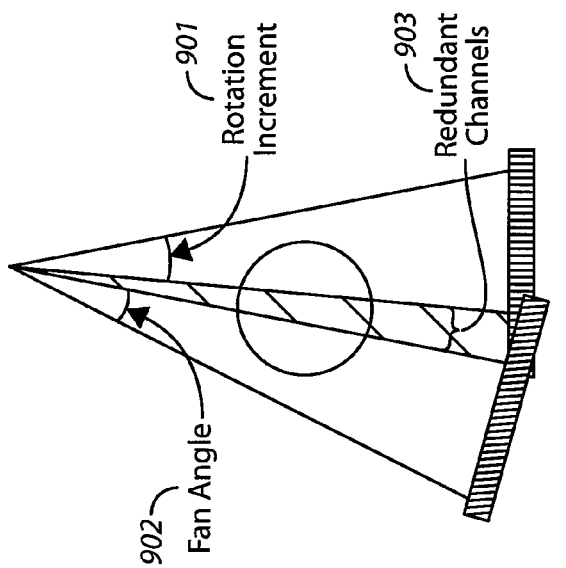
FIG. 9 comprises a schematic view as configured in accordance with various embodiments of the invention.

By another approach, this approach 800 instead provides for an adjust angular overlap step 803. The purpose of this step 803 is to determine how many output views to assign to each traverse, and to assign channel numbers to each view. The potential need for this step is illustrated in FIG. 9. When the rotation increment 901 is smaller than the fan angle 902, some channels 903 are redundant and their data can be discarded.

The first approach has the advantages that overlaps are blended together, reducing the possibility of seeing "seams" between traverses, and that no data is thrown away, which is generally good for reducing noise. This approach, however, introduces the possibility of introducing an angular dependence to the image noise levels and could perhaps introduce some blurring. The second approach reduces the risk of artifacts due to angularly dependent noise levels, but with a higher risk of visible seams. Note that the first approach can always be made equivalent to the second approach by using a very sharply transitioning weighting function, and thus different tradeoffs between the above advantages and disadvantages can be obtained by using the first approach and changing the sharpness of the transition in the weighting function. The rest of this description will describe the second (adjust angular overlap) approach, recognizing that the equations describing the overlap regions may be useful in finding the range of views (or channels) over which the weighting function must transition between 0 and 1.

Referring again to FIG. 8 and to continue with this description of the find angular overlap step 803, in the output sinogram the data from a given traverse will appear in output views $view_a$(traverse) to $view_b$(traverse). For each traverse, one can also identify leading and trailing channels. The leading edge of the fan-beam is that which will overlap the next upcoming traverse, and the trailing edge of the fan-beam is that which overlaps with the prior traverse. The first leading channel which this step will assign full weight is $ch_{lead}$(traverse) and the last trailing channel which this step will assign full weight $ch_{trail}$(traverse).

When there is no overlap in angular coverage between consecutive translations then all channels can be given full weight, and $view_a$ to $view_b$ will span $N_{channels}$ views. If, however, the rotation increment is smaller than the fan-beam angle, then some views/channels are given smaller weights in order to account for angular overlap.

This said, the follow nomenclature apples with respect to adjusting for angular overlap:

Inputs: $\Delta\beta$ The nominal rotation increment (always $\geq 0$)

RotSlop The maximum expected deviation of $\Delta\beta$ from nominal

NumHalfRots The number of 180° turns to resample to

Outputs: $N_{views}$ The total number of views in the output sinogram $view_a$(traverse) The first full-weighted output view for each traverse $view_b$(traverse) The last full-weighted output view for each traverse $ch_a$(traverse) The first output channel for each traverse $ch_b$(traverse) The last output channel for each traverse w(traverse,view) The weighting for the output data The nominal angular range to be trimmed from the leading edge of the fan is:

$$\gamma_{trim}^{lead} = \max\left\{0, \frac{\gamma[N_{channels} - 1] - \gamma[0] - \Delta\beta \times (1 + RotSlop)}{2}\right\} \qquad (18)$$

from which one can calculate the first leading edge channel to keep:

$$ch_{lead}^{nominal} = \begin{cases} 0, & \text{if } RotDir = 1 \\ N_{channels} - 1, & \text{if } RotDir = -1 \end{cases}$$

while $$RotDir \times \gamma[ch_{lead}^{nominal}] <$$
$$\frac{RotDir \times (\gamma[N_{channels} - 1] + \gamma[0]) - \Delta\beta \times (1 + RotSlop)}{2} do$$
$$ch_{lead}^{nominal} = ch_{lead}^{nomimal} + RotDir$$

Similarly, the nominal angular range to trim from the trailing edge is:

$$\gamma_{trim}^{trail} = \gamma[N_{channels} - 1] - \gamma[0] - \Delta\beta - \gamma_{trim}^{lead} \qquad (19)$$

from which one can calculate the last trailing edge channel to keep:

$$ch_{trail}^{nominal} = \begin{cases} N_{channels} - 1, & \text{if } RotDir = 1 \\ 0, & \text{if } RotDir = -1 \end{cases}$$

-continued while $$RotDir \times \gamma[ch_{trail}^{nominal}] >$$

$$\frac{RotDir \times (\gamma[N_{channels} - 1] + \gamma[0]) - \Delta\beta \times (1 + RotSlop)}{2} \, do$$

$$ch_{trail}^{nominal} = ch_{trail}^{nominal} - RotDir$$

Note that the RotSlop parameter is handled so that, if one plans to take the next rotation at a position somewhere between ($\Delta\beta$−RotSlop) and ($\Delta\beta$+RotSlop) beyond the current position, then one can process the current traverse without knowing exactly where in that range the next rotation position will fall. This feature allows for sorting with a low temporal lag since one can start processing a given translation before the next one even starts. Alternately, if a one-traversal (or longer) time lag is not an issue, one may wish to set RotSlop=0 regardless of the actual rotation accuracy.

The output view and channel ranges are then calculated as follows:

$$view_a(\text{traverse}) = \begin{cases} 0, & \text{if traverse} = 0 \\ view_b(\text{traverse} - 1) + 1, & \text{if traverse} > 0 \end{cases} \quad (20)$$

if traverse == 0

$$ch_{trail}(0) = ch_{trail}^{nominal} \quad (21)$$

else $$ch_{trail}(\text{traverse}) = \begin{cases} N_{channels} - 1, & \text{if } RotDir = 1 \\ 0, & \text{if } RotDir = -1 \end{cases} \quad (22)$$

while $$abs(\beta(\text{traverse}) - \beta(\text{traverse} - 1)) \leq$$
$$abs(\gamma[ch_{lead}^{nominal}] - \gamma[ch_{trail}(\text{traverse})])$$

$ch_{trail}(\text{traverse}) = ch_{trail}(\text{traverse}) - RotDir;$ if traverse == $N_{traverse}$ − 1

$$ch_{lead}(\text{traverse}) = \begin{cases} 0, & \text{if } RotDir = 1 \\ N_{channels} - 1, & \text{if } RotDir = -1 \end{cases} \quad (23)$$

while $$abs(\beta(0) - \beta(N_{traverse} - 1)) +$$
$$abs(\gamma[ch_{trail}^{nominal}] - \gamma[ch_{lead}(N_{traverse} - 1)]) >$$
$$NumHalfRots \times \pi$$

$ch_{lead}(\text{traverse}) = ch_{lead}(\text{traverse}) + RotDir$ else $ch_{lead}(\text{traverse}) = ch_{lead}^{nominal}$ $$view_b(\text{traverse}) = \quad (24)$$
$$view_a(\text{traverse}) - RotDir \times (ch_{lead}(\text{traverse}) - ch_{trail}(\text{traverse})).$$

It should be noted that for the alternate approach (the weighting approach), these equations (perhaps forcing RotSlop=0 and accepting a one-traversal time lag) may possibly be used to find the center of the weighting region. That is, channels in the middle of the detector may receive full weight, while near the ends of the detector, the weight smoothly rolls off to zero with a function that is locally symmetric about $ch_{lead}$ and again about $ch_{trail}$.

Ultimately, by one approach, these steps will be fixing a relationship between the input translation-position indices pidx and the output ray indices ray. It can be useful to calculate the maximum number of output rays such that for all $0 \leq \text{ray} \leq (N_{rays} - 1)$, the corresponding pidx values are valid, i.e. in the range $0 \leq \text{pidx} \leq (N_{tranpos} - 1)$.

Accordingly, if it is desired that all ray-groups have the same number of rays, the equation for the number of output rays can be expressed as (note that the definition of the variable $pos_{cent}$ appears further below):

$$N_{rays} = \text{floor}\left[2 \times \min\left\{\begin{array}{l} \frac{SOD}{\Delta p}\tan\gamma_{min} + \frac{pos_{cent} - TranPosMin}{\Delta p}, \\ -\frac{SOD}{\Delta p}\tan\gamma_{max} + \frac{TranPosMax - pos_{cent}}{\Delta p} \end{array}\right\} - \frac{abs(\text{Differential})}{\Delta p}\right] \quad (25)$$

where TranPosMin, TranPosMax are the same as before (whether or not Translational Position Correction is enabled).

The values $\gamma_{min}$ and $\gamma_{max}$ are calculated as follows:

$$\gamma_{min} = \max\left\{\gamma[0], \frac{\gamma[0] + \gamma[N - 1] - \Delta\beta \times (1 + RotSlop)}{2}\right\}$$

$$\gamma_{max} = \min\left\{\gamma[N - 1], \frac{\gamma[0] + \gamma[N - 1] + \Delta\beta \times (1 + RotSlop)}{2}\right\}$$

where $\Delta\beta$ and RotSlop are the same as has been set forth above.

To avoid unnecessary interpolations, the output sinogram produced by the approach 800 may have irregularly spaced output views, and the ray-spacing and central ray may change from view to view. Accordingly, this approach 800 can also provide a step 804 to provide for calculating the view dependent parameters that can be usefully supplied to a parallel-beam filtered-backprojection module.

For each traverse, the calculation is:
for view=$view_a$(traverse) to $view_b$(traverse) {

$$\text{channel}=ch_{lead}(\text{traverse})-RotDir \times (\text{view}-\text{view}_a(\text{traverse})) \quad (26)$$

Calculate View Angle
Calculate Ray Pitch
Calculate Central Ray and $tran_0$
}
The calculation details are as follows:
For the view angle:
Output: θ[view] The angle θ of the parallel rays for output view
View angle is calculated by:

$$\theta(\text{view})=\beta(\text{rotidx})-\gamma[\text{channel}] \quad (27)$$

For the View-Dependent Ray Pitch:
Output: Δt[view] The ray spacing for each view (in mm)
Ray pitch is calculated by:

$$\Delta t(\text{view})=\Delta p \times \cos\gamma[\text{channel}] \quad (28)$$

For the View-Dependent Central Ray and $tran_0$:
In order to compute an accurate central ray, it can be useful to know the value which corresponds to the centered table position (that is, the table position where the ray through the rotation axis is perpendicular to the translate axis. Often, for a flat detector, this ray is desired to be perpendicular to the detector face as well). Table position is measured relative to some reference position. Some systems may be designed so that pos=0 corresponds, at least approximately, to the centered table position. Others may be designed so that pos=0 corresponds to some non-centered position, and thus the centered position may correspond to a large value of pos. Therefore, it can be assumed that a true position corresponds to the following function of measured position:

$$p_{true} = p_{measured} - pos_{cent} - \frac{\text{Differential}}{2} \times TranDir$$

The parameter $pos_{cent}$ is the average true center position, and Differential is the difference between measurements at the same position when traveling in the positive versus negative direction. Note that since our algorithm supports arbitrary values of $pos_{cent}$ and Differential, we can avoid the expense and hassle of mechanical adjustment to try and obtain any particular values for these.

Generally, $pos_{cent}$ and Differential are perhaps better determined through calibration scans rather than physical measurement. Calibrations approaches (including, for example, the contents of the aforementioned METHOD AND APPARATUS TO FACILITATE FORMING DETECTOR-LEVEL CALIBRATION INFORMATION FOR A HIGH ENERGY-BASED SCANNER) are known in the art and need no further elaboration here.

Figure 7:
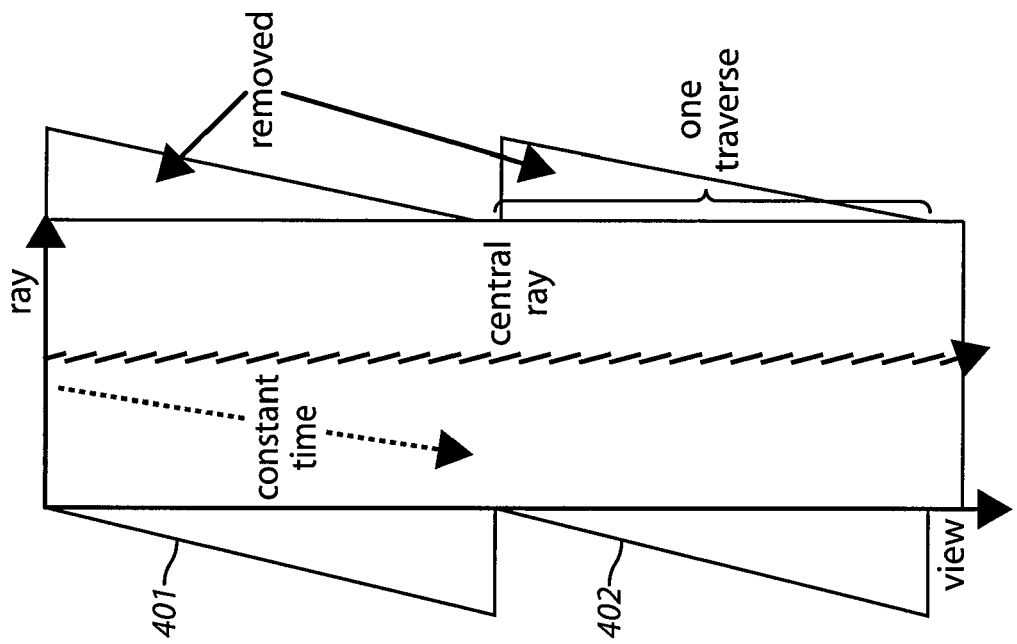
FIG. 7 comprises a schematic view as configured in accordance with various embodiments of the invention.
Figure 6:
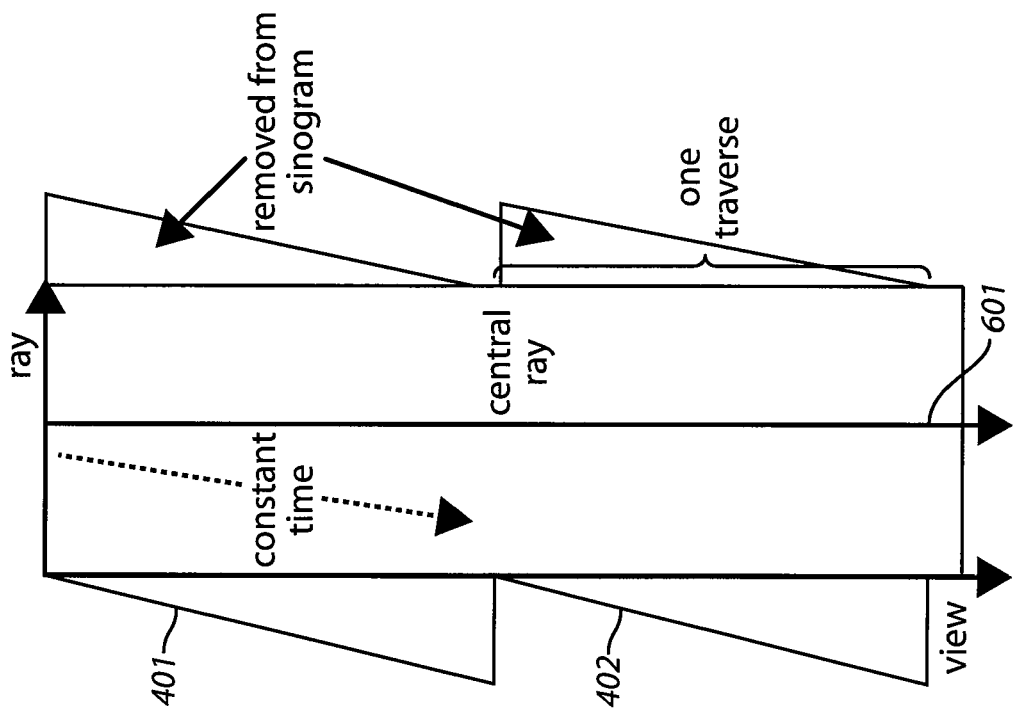
FIG. 6 comprises a schematic view as configured in accordance with various embodiments of the invention.

Following these steps, for the approach of FIG. 6 or FIG. 7, the central ray in the output sinogram will be made fairly close to some desired value. Usually, the desired value will be the center of the output sinogram:

$$c_{new} = \frac{N_{rays} - 1}{2}. \tag{29}$$

where $N_{rays}$ is the number of output rays which can be calculated using (25). To make the output central ray exactly equal to (29), as in FIG. 6, each view would need to be shifted a different non-integer amount, causing interpolation losses. Accordingly, as an alternative, these teachings find integer shift amounts so that the output sinogram will have a view-dependent central ray within ±0.5 pixels of $c_{new}$, as in FIG. 7. The steps for this last approach are now described.
Input:
$pos_{center}$ The central table position (mm)
Differential Position encoder error differential
Output:
$c_{ray}^{out}$(view) The output central ray for each view
$tran_0$(view) The value of pidx corresponding to output ray=0.
The central ray and $tran_0$ parameters are calculated by the following equations:

$$tran_0(\text{view}) = \text{round}(tran_0^{ideal}(\text{view})) \tag{30}$$

$$c_{ray}^{out}(\text{view}) = c_{new} + TranDir(\text{traverse}) \times [tran_0(\text{view}) - tran_0^{ideal}(\text{view})] \tag{31}$$

where the ideal centering shift is given by:

$$tran_0^{ideal}(\text{view}) = \tag{32}$$
$$\left( \frac{SOD \times \tan\gamma[\text{channel}] + pos_{cent} - pos(0, \text{traverse})}{\Delta p} + c_{new} \right) \times$$
$$TranDir(\text{traverse}) - \frac{\text{Differential}}{2\Delta p}$$

Note that pos(0,traverse) is the initial starting position for each traverse.
Note that the approach of FIG. 5 can be achieved similar to the above but by using a constant value of $tran_0$ (i.e. a value corresponding to no shift or to a flipping operation), and replacing the $c_{ray}$ with a suitable corresponding calculation.

This approach 800 now provides for sorting 805 the data.
Output: $P_{par}$(ray,view) output parallel projections This sort-to-parallel operation may be performed either in a push or pull style sort. In the push style, one steps through all input data values and pushes them into their proper output slots. In the pull style, one steps through all output data slots and pulls in the appropriate input data.

The steps for push-sorting are:
for pidx=0 to ($N_{tranpos}$-1) {
for (channel=$ch_{lead}$(traverse); channel≦$ch_{trail}$(traverse); channel+=RotDir) {

$$\text{view}=\text{view}_a - RotDir \times (\text{channel} - ch_{trail}(\text{traverse})) \tag{33}$$

$$\text{ray}=TranDir(\text{traverse}) \times (pidx - tran_0(\text{view})) \tag{34}$$

If ray≧0 and ray≦($N_{rays}$-1) then $$P_{par}(\text{ray,view}) = P(\text{channel},pidx,\text{traverse}) \tag{35}$$

}
}
}
The steps for pull-sorting are:
for view=$\text{view}_a$(traverse) to $\text{view}_b$(traverse) {

$$\text{channel}=ch_{trail}(\text{traverse}) - RotDir \times (\text{view} - \text{view}_a(\text{traverse})) \tag{36}$$

for ray=0 to ($N_{rays}$-1) {

$$pidx = tran_0(\text{view}) - TranDir(\text{traverse}) \times \text{ray} \tag{37}$$

$$P_{par}(\text{ray,view}) = P(\text{channel},pidx,\text{traverse}) \tag{38}$$

}
}
Note that, for the weighting approach, the algorithm may iterate over (and make use of) the full data set rather than just $ch_{lead}$ to $ch_{trail}$ or $\text{view}_a$ to $\text{view}_b$. Furthermore, the data can be weighted during the sort operation (during (35) or (38)) or alternatively a weighting can be saved for each ray-group and applied during reconstruction. The latter approach keeps the "sorting" as a pure sorting (i.e. only moving data, not changing its values) and allows the weighting to potentially be combined with other weighting operations that are standard parts of filtered backprojection.

This sorted data can then be fed to a filtered backprojection algorithm to form the reconstructed image. Such algorithms generally involve several steps. First, filtering is applied, in which the projection data is convolved with a ramp filter or modified ramp filter, often through the use of fast Fourier transforms. Second, the data is weighted (though this can often be combined with the filtering step, or moved to before it), as a function of the local view density, perhaps in addition to as a function of the ray spacing. Third, the data is back-projected, where the filtered and weighted ray values are projected and summed to form a reconstructed image. In ray-driven backprojection, one steps through each ray and pushes its value across all pixels it intersects. In pixel-driven backprojection (the preferred method), one steps through each image pixel and pulls the appropriate value from the ray data. This generally incurs one level of interpolation as the positions to be pulled from are generally non-integer and do not correspond to the available data locations (note that these locations do not tend to fall in any convenient pattern and thus one may generally decline to view this interpolation as a resampling).

Now consider how backprojection uses the view-dependent view-angle, central ray, and ray spacing information. Many backprojection algorithms natively support arbitrary (or irregularly spaced) view positions. Such algorithms need only be fed the calculated view-angle for each ray group to properly account for view angle. It is also straightforward to modify backprojection to account for view-dependent central ray and ray-spacing information when calculating the position of each ray. Lastly, the weighting step can be modified so that when performing the weighting based on local-view-density, view density is calculated from the calculated view positions, and if necessary, it can also be modified to allow a different ray-spacing to weight each view.

For the interested reader, this description of a particular detailed instantiation of these teachings will now conclude with a few comments regarding calibration as pertain to certain geometrical parameters of interest.

Perpendicular Ray $P_{ray}^{in}$ is the channel-index of the ray from the source that is perpendicular to the translate axis (and usually perpendicular to the detector face). If the system is properly aligned, this should usually be parallel to the SOD axis, and be equal to the invariant central ray. It should also be the channel irradiated by a ray from the source through the rotation axis when the table is at position $pos_{cent}$. It may be measured via calibration, or calculated from system geometry. Note that the term "channel-index" used here will generally refer to a non-integer value specifying a location on the detector to a much finer resolution than the channel spacing.

Central Position $pos_{cent}$ is the translational position for which the ray from the source through the rotation axis is perpendicular to the translate axis. Any errors in $pos_{cent}$ will ultimately have the same effect as errors in central ray value for third-generation scans. Good reconstructions will therefore require a fairly precise value of $pos_{cent}$. Known calibration procedures can be applied to determine $pos_{cent}$ from a calibration scan as will be well understood by those skilled in the art. In some cases, it may be desirable to measure both $P_{ray}$ and $pos_{cent}$ jointly, such as from a single calibration scan. If one already knows $P_{ray}$, one can use a centered pin, an off-centered pin, or even an arbitrary object in conjunction with known techniques to determine $pos_{cent}$. If $P_{ray}$ is not already known, both of these variables can be determined at the same time, again through use of existing techniques that are available to those skilled in the art.

Position Differential

Differential is the difference between the measured positions of equivalent table positions when translating in the forward direction versus the reverse direction. For instance, it may be due to mechanical backlash within the translation motor. Or it may be due to at what point in time the position is measured relative to within the integration period. If this parameter is wrong, streaks can appear in the reconstructed image at angles corresponding to traverse boundaries. Again, known calibration techniques are available that will determine Differential from a calibration pin scan. Note that Differential is only really important for bi-directional scanning, not uni-directional scanning.

Figure 10:
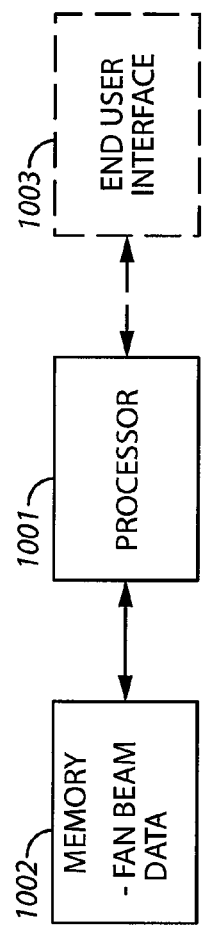
FIG. 10 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 10, an illustrative approach to such a platform will now be provided.

In this illustrative embodiment, the enabling apparatus 1000 can comprise a computer of choice. This computer can include both a processor 1001 and a memory 1002 that operably couples to the processor 1001. Those skilled in the art will recognize and appreciate that such a processor can comprise a fixed-purpose hard-wired platform or can comprise a partially or wholly programmable platform. All of these architectural options are well known and understood in the art and require no further description here. The memory 1002 can serve to store the aforementioned fan-beam data as was acquired via a translate-rotate computed tomography acquisition process.

The processor 1001, in turn, can be configured and arranged (via, for example, programming as will be well understood by those skilled in the art) to reconstruct an image from the fan-beam data without resampling (and/or without interpolating) any pixel positions other than to optionally resample (or interpolate) pixel positions to compensate for non-uniform translation intervals as described above. This can include configuring the processor 1001 to carry out any one or more of the aforementioned steps, actions, and functionality as desired.

This apparatus 1000 can further comprise, if desired, an optional end user interface 1003. This can comprise an input mechanism (such as, but not limited to, a keyboard, a touch screen, a cursor control mechanism, a control console, a voice recognition mechanism, and so forth) to permit the end user to instigate and/or influence the operation of the apparatus 1000. This end user interface 1003 can also comprise an output mechanism such as a dynamic display of choice. This can include, for example, a cathode ray tube display, a liquid crystal display, and so forth (with many other options being presently available as will be well understood by those skilled in the art.

Those skilled in the art will recognize and understand that such an apparatus 1000 may be comprised of a plurality of physically distinct elements as is suggested by the illustration shown in FIG. 10. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured, those skilled in the art will recognize and appreciate that these teachings are highly flexible and can be leveraged in various ways in conjunction with existing platforms and methodologies. These teachings are also readily scaled to accommodate, for example, fan-beam data of varying sizes and resolution.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one example in this regard, when using multi-row detectors, these teachings can be readily applied with respect to each row independently of one another.

I claim:

1. A method comprising:
   providing fan-beam data via a translate-rotate computed tomography acquisition process; and
   using a list of, for each channel, an angle of the channel relative to an input reference ray, wherein the input reference ray is defined relative to a translation axis for the translate-rotate computed tomography acquisition process, to reconstruct an image from the fan-beam data without resampling any pixel positions to compensate for either of:
rotation angles;
fan-beam-referenced angles.

2. The method of claim 1 wherein reconstructing an image from the fan-beam data comprises grouping together pixels as correspond to fan-beam rays that share a same angle notwithstanding translational differences between the fan-beam rays to provide resultant pixel groups.

3. The method of claim 2 wherein grouping together pixels as correspond to fan-beam rays that share a same angle further comprises not using pixels from at least some fan-beam rays that do not usefully contribute to a reconstructed image.

4. The method of claim 2 wherein grouping together pixels as correspond to fan-beam rays that share a same angle further comprises storing pixel group dependent information as corresponds to the resultant pixel groups.

5. The method of claim 4 wherein the pixel group dependent information comprises, at least in part, ray-spacing information.

6. The method of claim 4 wherein the pixel group dependent information comprises, at least in part, ray angle information.

7. The method of claim 6 wherein the ray angle information comprises, at least in part, at least one of:
a rotation angle as corresponds to the pixels comprising a given pixel group;
a fan-beam-referenced angle.

8. The method of claim 7 wherein the fan-beam-referenced angle comprises an angle as measured from a central ray as corresponds to the fan-beam.

9. The method of claim 7 wherein the ray angle information comprises both of the rotation angle and the fan-beam-referenced angle.

10. The method of claim 9 wherein the ray angle information comprises a sum of the rotation angle and the fan-beam-referenced angle.

11. The method of claim 1 wherein the arbitrarily-shaped detector array comprises any of a flat-shaped detector array, a curved-shaped detector array, and a polygon-shaped detector array.

12. The method of claim 1 wherein reconstructing an image from the fan-beam data comprises sorting the fan-beam data into parallel-beam data and performing parallel-beam reconstruction.

13. The method of claim 12 wherein performing parallel-beam reconstruction comprises performing filtered-back projection.

14. The method of claim 12 wherein performing parallel-beam reconstruction comprises taking into account a different central-ray value and a different ray-spacing for each ray group.

15. The method of claim 14 wherein each ray group is weighted according to a local density as corresponds to ray group view angles.

16. The method of claim 14 wherein ray groups are further grouped into translation groups, and each ray group is weighted according to translation group overlap.

17. The method of claim 1 wherein reconstructing an image from the fan-beam data further comprises reconstructing an image from the fan-beam data using resampling to compensate for non-uniform translation intervals when the fan-beam data is based upon non-uniform translation intervals.

18. An apparatus comprising:
a memory having fan-beam data stored therein as was acquired via a translate-rotate computed tomography acquisition process;
a processor operably coupled to the memory and being configured and arranged to use a list of, for each channel, an angle of the channel relative to an input reference ray, wherein the input reference ray is defined relative to a translation axis for the translate-rotate computed tomography acquisition process, to reconstruct an image from the fan-beam data without resampling any pixel positions to compensate for either of:
rotation angles;
fan-beam-referenced angles.

19. The apparatus of claim 18 wherein the processor is further configured and arranged to reconstruct an image from the fan-beam data by grouping together pixels as correspond to fan-beam rays that share a same angle notwithstanding translational differences between the fan-beam rays to provide resultant pixel groups.

20. The apparatus of claim 19 wherein the processor is further configured and arranged to group together pixels as correspond to fan-beam rays that share a same angle by storing pixel group dependent information as corresponds to the resultant pixel groups.

21. The apparatus of claim 20 wherein the pixel group dependent information comprises, at least in part, ray angle information.

22. The apparatus of claim 21 wherein the ray angle information comprises, at least in part, at least one of:
a rotation angle as corresponds to the pixels comprising a given pixel group;
a fan-beam-referenced angle.

23. The apparatus of claim 22 wherein the fan-beam-referenced angle comprises an angle as measured from a central ray as corresponds to the fan beam.

24. The apparatus of claim 22 wherein the ray angle information comprises both of the rotation angle and the fan-beam-referenced angle.

25. The apparatus of claim 24 wherein the ray angle information comprises a sum of the rotation angle and the fan-beam referenced angle.

26. The apparatus of claim 18 wherein the processor is further configured and arranged to reconstruct an image from the fan-beam data by sorting the fan-beam data into parallel-beam data and performing parallel-beam reconstruction.

27. The apparatus of claim 26 wherein the processor is further configured and arranged to perform parallel-beam reconstruction by performing filtered-backprojection.

28. The apparatus of claim 26 wherein the processor is further configured and arranged to perform parallel-beam reconstruction by taking into account a different central-ray value and a different ray-spacing for each ray group.

29. The apparatus of claim 18 wherein the processor is further configured to reconstruct an image from the fan-beam data by reconstructing an image from the fan-beam data using resampling to compensate for non-uniform translation intervals when the fan-beam data is based upon non-uniform translation intervals.

* * * * *

UNITED STATES PATENT AND TRADEMARK OFFICE
CERTIFICATE OF CORRECTION

PATENT NO. : 8,218,720 B2  
APPLICATION NO. : 12/046347  
DATED : July 10, 2012  
INVENTOR(S) : Kevin Holt Page 1 of 1

It is certified that error appears in the above-identified patent and that said Letters Patent is hereby corrected as shown below:

ON THE TITLE PAGE OF THE PATENT:
In column 2, under (74) Attorney, Agent or Firm, please delete "Flanner" and insert --Flannery--.

Signed and Sealed this
Thirtieth Day of October, 2012

David J. Kappos
*Director of the United States Patent and Trademark Office*